United States Patent [19]

Pezzarossi

[11] Patent Number: 4,854,545
[45] Date of Patent: Aug. 8, 1989

[54] FAUCET VALVE WITH DIAGONAL SEALING RING

[76] Inventor: John J. Pezzarossi, P.O. Box 3033, Abilene, Tex. 79604

[21] Appl. No.: 211,998

[22] Filed: Jun. 27, 1988

[51] Int. Cl.$^4$ .............................................. F16K 5/04
[52] U.S. Cl. .................................. 251/310; 137/454.6
[58] Field of Search ....................... 251/209, 310, 314; 137/454.6

[56] References Cited

U.S. PATENT DOCUMENTS

| | | | |
|---|---|---|---|
| 3,166,097 | 1/1965 | Hinderer | 251/310 X |
| 4,395,018 | 7/1983 | Moen | 251/900 X |
| 4,699,358 | 10/1987 | Iqbal | 251/310 |
| 4,765,590 | 8/1988 | Hayman | 251/310 |

Primary Examiner—A. Michael Chambers
Assistant Examiner—John C. Fox

[57] ABSTRACT

An improved faucet valve utilizes a static diagonal sealing ring which coacts with a control member cylindrical flow control portion having a tapered lower end portion in a relationship that provides: substantially 180 degrees of control member rotation from full open to full close and vice versa, with metering of fluid flow taking place over a major portion of the control member rotational range; contact of nearly all of the sealing ring inner periphery with the control member flow control portion during initial opening and final closing stages when differential pressure is high, so there is no tendency for the sealing ring to be forced out of its grooves; the diagonal sealing ring does not move past a fluid discharge opening or vice versa, so the diagonal sealing ring is not subjected to chafing which would result in excessive wear.

5 Claims, 3 Drawing Sheets

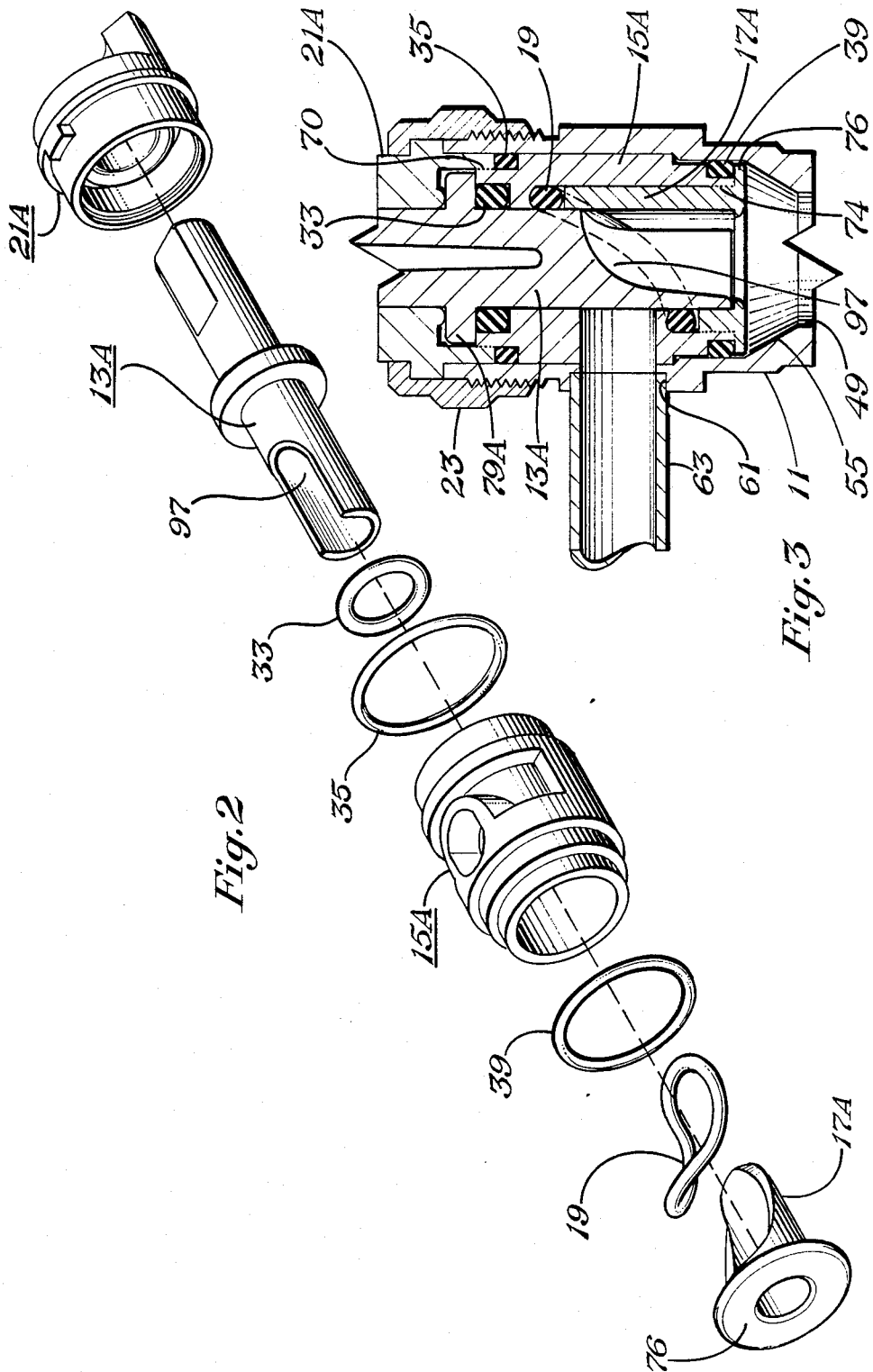

FAUCET VALVE WITH DIAGONAL SEALING RING

FIELD OF THE INVENTION

The invention relates to faucet valves of the type used for kitchen sinks, lavatories, bath tubs, showers, and the like; and more particularly to an improved structure and metering arrangement utilizing a diagonal sealing ring.

DESCRIPTION OF THE PRIOR ART

There are numerous examples in the prior art of which I am aware, of the utilization of diagonal sealing rings including diagonal O-ring seals in valves including faucet valves. Exemplary of such prior art patents are U.S. Pat. Nos. 2,484,723, 2,261,886, 2,695,036, 2,631,002, 3,166,097, 3,815,871, 3,874,637, and 4,004,775.

In some of the prior art patents, such as U.S. Pat. Nos. 2,631,002, 3,166,097, 3,815,871, 3,874,637 and 4,004,775, the diagonal sealing ring is not static and must be moved past a port the edges of which can cause damage to the seal. In other of the prior art patents, such as U.S. Pat. Nos. 2,848,723 and 2,621,886, the diagonal sealing ring is static but a port must be moved past the seal, and the port edges can cause damage to the seal. In some of the prior art patents, such as U.S. Pat. Nos. 2,484,723, 2,621,886 and 2,631,002, a movable port must be aligned with a fixed port and metering of the fluid flow takes place over only a small rotational angle (as little as 30 degrees), with resulting wasted motion and poor metering control. In some of the prior art patents, such as U.S. Pat. Nos. 2,695,036, 3,815,871, 3,874,637 and 4,004,775, a relatively large portion of the diagonal sealing ring is exposed when the valve is in the early stages of opening and the final stages of closing and is thus subjected to maximum differential pressure forces which tend to force the sealing ring out of its groove or seat, with resulting valve malfunction.

Co-pending U.S. patent application Ser. No. 06/930,318 filed Nov. 12, 1986, now abandoned which is owned by the assignee of this application, discloses a faucet valve which utilizes a diagonal sealing ring and which is free of the disadvantages above mentioned.

The faucet valve of the co-pending application is susceptible to additional improvement and it is the objective of this invention to accomplish such improvements, as will hereinafter appear.

Specifically, it is desirable that the faucet valve such as of the co-pending application Ser. No. 06/930,318, filed 11/12/86, now abandoned by Dennis Hayman, and owned by the assignee of this application, have the following features not heretofore provided:

(1) The invention should have protection against the deleterious effects of incoming fluid in the bottom of the valve.

(2) The valve should have improved axial stability of the flow control portion.

(3) The valve should have ease of assembly and eliminate many of the prior art elements and preparation steps.

SUMMARY OF THE INVENTION

It is an object of this invention to provide an improved valve that has one or more of the features delineated hereinbefore as being desirable and not heretofore provided.

It is a specific object of this invention to provide an improved valve having all of the features delineated as desirable hereinbefore and not heretofore provided.

These and other objects will become apparent from the descriptive matter hereinafter, particularly when taken in conjunction with the appended drawings.

In accordance with this invention there is provided an improved faucet valve structure characterized by: (a) a valve body having a bottom fluid inlet passage and a side fluid discharge passage having a central axis; (b) upper and lower sleeve member disposed in said inlet passage, said upper and lower sleeve members each having interior cylindrical surface the same diameter, said upper and lower sleeve members having complimentary oppositely facing diagonal grooves for receiving and retaining a diagonal sealing ring, said lower sleeve member having at its bottom end a peripheral, radially extending flange that protects against the deleterious effects of incoming fluid; (c) a diagonal sealing ring having a central axis and disposed in said groove, the configuration orientation of the grooves being such that the central axes of the discharge passage and the sealing ring intersect and said sealing ring is symmetrically disposed about an imaginary cylindrical projection of said discharge passage; (d) a flow control member having a flow control portion having a stem portion with cylindrical exterior surface that is matingly received within the interior cylindrical surfaces of the upper and lower sleeve members and having a length sufficient to extend beyond the upper and lower extremities of the diagonal sealing ring, having a lower end portion that includes a flow direction transition surface, and having a cylindrical skirt portion that encompasses the transition surface and is, in turn, conformingly received in the lower sleeve member for improved axial stability, and the control member is fully rotatable through the 180 degrees from full open position to a full close position or vice versa with the sealing ring being in contact with the exterior surface of the control member flow control portion over a major portion of the sealing ring inner periphery during the initial stages of opening of the valve when differential pressure is high and with metering of fluid flow extending over a major portion of the control member rotational range; and having an enlarged intermediate flange portion that is trappingly received for improved axial stability; whereby there is provided a faucet with a combination of a static, diagonally disposed seal and a flow control portion that is rotatable and throttling throughout the major portion of its rotation and without moving any control past the diagonal sealing ring so as to prevent seal damage due to cutting, chaffing or excessive wear and so as to prevent seal blowout due to high differential pressure of relatively narrow throttling range; and having the advantages of having protection against incoming fluid and any contaminants therein and having improved axial stability and ease of assembly.

The control member is pivotally retained, as implied hereinbefore by saying that the control member is "fully rotatable through the 180 degrees from full open to full close position or vice versa".

BRIEF DESCRIPTION OF THE DRAWINGS

FIG. 2 is an isometric exploded view of the valve core assembly.

FIG. 3 is a partial longitudinal section view like FIG. 1, but with some portions omitted, and with the faucet valve in the full closed position.

DESCRIPTION OF PREFERRED EMBODIMENTS

Figure 4:
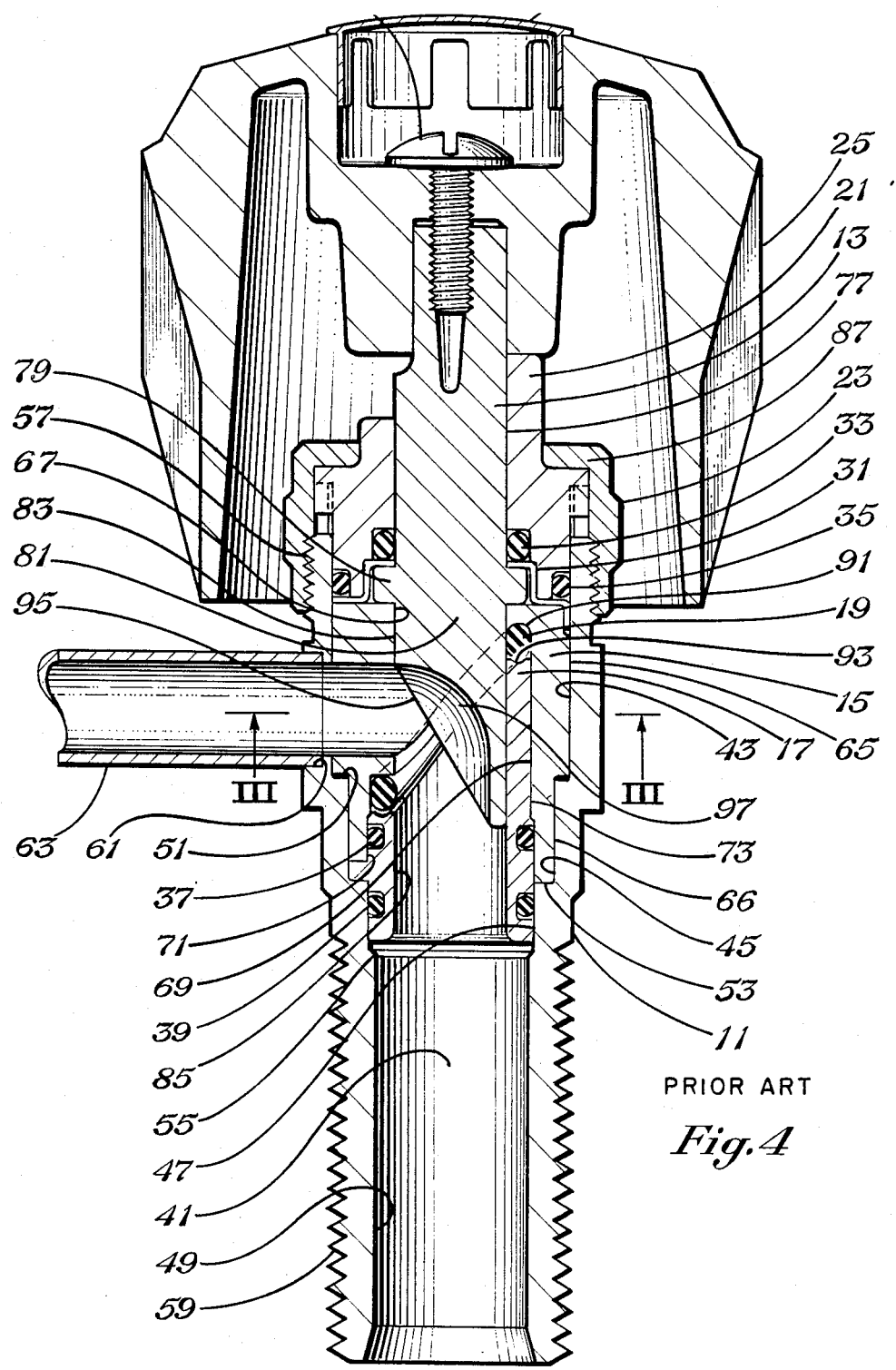
FIG. 4 is a longitudinal section view showing the entire assembly for a single faucet valve in accordance with the disclosure of the co-pending prior art application hereinabove mentioned.

In describing the present invention it will be useful to first describe the faucet valve assembly in accordance with the prior art disclosure of the co-pending application above mentioned, as shown by FIG. 4 of the drawings, and then describe the present invention in terms of the differences between the two. For convenience reference numerals that apply to parts that may be common to both faucet valve assemblies will be the same, and those which apply only to the faucet valve assembly of the present invention will include the letter "a".

The prior art faucet valve assembly as shown by FIG. 4 includes a valve body 11, a control member 13, upper and lower sleeve members 15, 17, diagonal O-ring 19, retaining member 21, bonnet nut 23, handle 25, handle retainer screw 27, plug button 29, control member retainer washer 31, control member stem portion sealing member 33, and static sealing members 35, 37, 39.

The valve body 11 is generally cylindrical and has a central cavity 41 formed by upper, intermediate, lower and inlet bores 43, 45, 47, 49, having successively smaller diameters. Adjacent bores are jointed by respective first, second and third shoulders 51, 53, 55. The upper exterior portion of the valve body 11 is provided threads 57 to receive the bonnet nut 23 and the lower exterior portion is provided threads 59 to receive mounting retainer parts and connections to a fluid supply source (not shown). The valve body 11 has an outlet opening or discharge passage 61 communicating with the valve body central cavity via the sidewall of the upper bore 43. The outlet opening 61 is connected to a suitable spout (not shown) via a conduit 63.

The upper sleeve member 15 is generally cylindrical, having exterior cylindrical surfaces 65, 66 that mate respectively with the upper and intermediate bores 43, 45 of the valve body 11, and having upper, intermediate and lower interior cylindrical surfaces 67, 69, 71 of successively increasing diameter.

The lower sleeve member 17 is also generally cylindrical, having a first exterior cylindrical surface 73 that mates with the intermediate interior cylindrical surface 69 of the upper sleeve member 15 and a second exterior cylindrical surface 75 that mates with the lower intermediate cylindrical surface 71 of the upper sleeve member 15, as well as with the lower bore 47 of the valve body 11.

The control member 13 is generally cylindrical and has a stem portion 77, a flange portion 79 and a flow control portion 81. The flow control portion 81 has a cylindrical exterior surface 83 that mates with the upper interior cylindrical surface 67 of the upper sleeve member 15, as well as with the cylindrical interior surface 85 of the lower sleeve member 17.

The retaining member 21 has a generally cylindrical shape and has a cylindrical exterior surface that mates with the upper bore 43 of the valve body 11, and an interior cylindrical surface that mates with the cylindrical surface of the control member stem portion 77. The handle 25 is retained on the stem portion 77 by the usual screw 27, and the handle screw receiving cavity is closed by the usual plug button 29. A projection on the handle 25 coacts with the usual stop means on the retaining member 21 to permit 180 degrees of handle rotation and hence 180 degrees of control member rotation, which will permit the faucet valve to move from the full closed to the full open position and vice versa.

The bonnet nut 23 has a usual configuration including threads that engage the threads 57 at the upper end of the valve body 11 and an end wall 87 that engages a shoulder on the retaining member 21 to clamp the retaining member, the control member retainer washer 31, the upper and lower sleeve members 15, 17 and the control member 13 all in their proper assembled relationships. Sealing between the lower sleeve member 17 and the valve body 11, the upper and lower sleeve members 15, 17 and the retainer member 21 and the valve body 11, is provided by respective O-rings 39, 37, 35. Sealing between the retainer member 21 and the control member stem portion 77 is provided by O-ring 33.

The valve body 11, retaining member 21, and upper and lower sleeve members 15, 17 are provided the usual type slots and/or projections for retaining and proper orientation purposes.

The upper and lower sleeve members 15, 17 are provided complimentary opposite facing diagonal grooves 91, 93 for receiving and retaining the diagonal O-ring 19. The configuration of the grooves 91, 93 and their orientation when the valve is assembled is such that the central axes of the discharge passage 61 and the O-ring 19 intersect, with the O-ring 19 being symmetrically disposed about an imaginary cylindrical projection of the discharge passage 61.

The flow control portion 81 of the control member 13 has a length sufficient to extend beyond the upper and lower extremities of the diagonal O-ring 19. The flow control portion 81 further has a tapered lower end portion 95, with the taper beginning with the point adjacent the upper extremity of the discharge passage 61. The tapered end portion 95 includes a flow direction transition surface 97.

Figure 1:
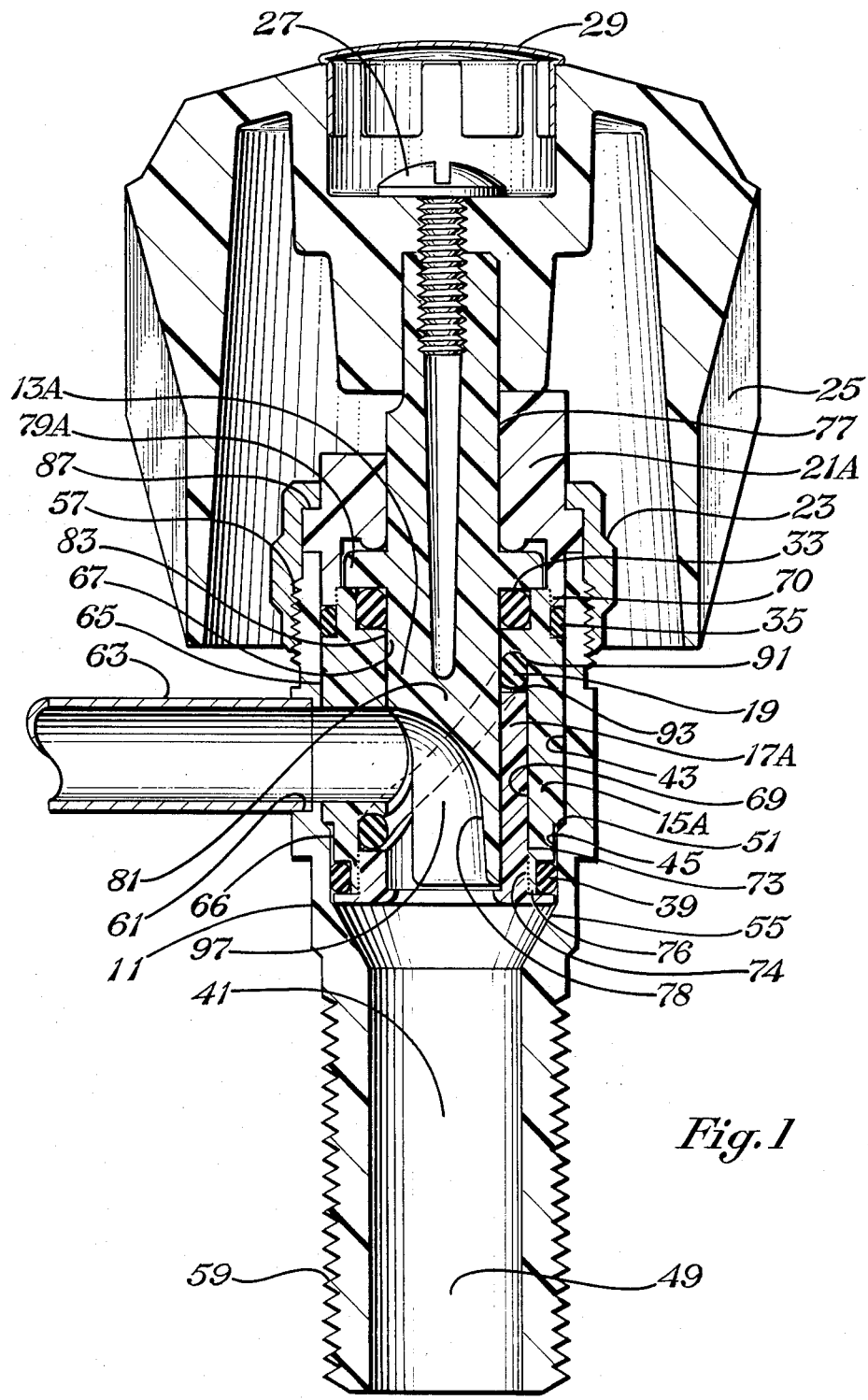
FIG. 1 is a longitudinal section view showing the entire assembly for a single faucet valve in accordance with a preferred embodiment of the invention and showing the valve in the full open position.

Referring now to FIG. 1 for the improved embodiment of this invention, it is believed helpful to again go through the elements and compare them with the configuration of the prior art of FIG. 4. Specifically, the faucet valve assembly of FIG. 1 includes a valve body 11, a control member 13a, upper and lower sleeve members 15a, 17a; diagonal O-ring 19, retaining member 21a, bonnet nut 23, handle 25, handle retainer screw 27, plug button 29, control member stem portion sealing member 33, and static sealing members 35 and 39.

Most of the parts are quite similar to those illustrated and described hereinbefore so only a cryptic description will be given of the respective parts, although the changes will be emphasized when there is a change between the prior art part and the part of this invention. As described hereinbefore with respect to the prior art embodiment, the valve body 11 is generally cylindrical and has a central cavity 41 formed by upper, intermediate, and inlet bores 43, 45, 49 having successively smaller diameters. The lower bore 47 of FIG. 4 and the intermediate bore 45 have the same effective diameter in this embodiment, since there is no need for a separate bore 47 in this embodiment. Adjacent bores are joined by respective first and third shoulders 51, 55. Since there is no need for a separate lower bore 47, there is no need for an intermediate shoulder 53. The upper exterior portion of the valve body 11 is provided threads 57 to receive the bonnet nut 23 and the lower exterior portion is provided threads 59 to receive mounting retainer parts in connection to a fluid supply source (not shown). The valve body 11 has an outlet opening or discharge passageway 61 communication with the valve body central cavity by the side wall of the upper bore 43. The outlet opening 61 is connected to a suitable spout (not shown) by a conduit 63.

Similarly as described hereinbefore, the upper sleeve member 15a is generally cylindrical, having exterior cylindrical surfaces 65, 66 that are matingly received within the upper and intermediate bores 43, 45 of the valve body 11 and having upper and lower interior cylindrical surfaces 67, 69 for receiving the control member 13a and the lower sleeve member 17a. The upper sleeve member 15a is welded, as by ultra sound energy, to retaining member 21a, as shown by weld 70.

The lower sleeve member 17a is also generally cylindrical, having a first exterior cylindrical surface 73 that is matingly received by the lower interior cylindrical surface 69 of the upper sleeve member 15a. The lower sleeve member 17a is welded as by sonic welding, to the upper sleeve member 15a near the bottom of the upper sleeve member 15a, as shown by weld 74, and has a flange 76 that extends radially exteriorly and interiorly to protect interfaces from the deleterious effects of water rushing upwardly through the bore 41, carrying, as it frequently does, particulate solids such as sand, grit and the like. The lower sleeve member 17a also has a generally cylindrical interior surface 78 that conformingly receives the exterior surface of the control member 13a for additional stability at high rates of flow.

The control member 13a is generally cylindrical and has a stem portion 77, a flange portion 79a and a flow control portion 81. The flow control portion 81 has a cylindrical exterior surface 83 that mates with the upper interior cylindrical surface 67 of the upper sleeve member 15a as well as with the cylindrical interior surface of the lower sleeve member 17a.

The handle 25 is retained on the stem portion 77 by the usual screw 27, as in the prior art, and the handle screw receiving cavity is closed by the usual plug button 29. A projection on the handle 25 coacts with the usual stop means on the retaining member 21 to permit 180 degrees of handle rotation and hence 180 degrees of control member rotation, which will permit the faucet valve to move from the full close to the full open position and vice versa.

The material of construction for the respective elements, or parts, may be any that are conventionally employed. For example, they can be machined from brass or the like. It has been found advantageous to employ thermoplastic material to form the elements of this invention. Such thermoplastic materials are well known and may range from moldable thermoplastic, such as Acetal through polyvinyl chloride. Where the sonic weld between the retainer of the upper sleeve is employed, the control member must be formed of a different material, to prevent welding to the other parts. As a preferred example, the control member may be formed of Ultem, a polyetherimide available from General Electric Company.

The seal members will be formed of the materials ordinarily employed in this art. For example, Neoprene rubber has been found to be an excellent material from which to form the O-rings which form the seal members as will be seen from the descriptive matter hereinafter and the drawings.

The bonnet nut 23 has the usual configuration including threads that engage the threads 57 at the upper end of the valve body 11 and an end wall 87 that engages a shoulder on the retaining member 21a to clamp retaining member 21a, the upper and lower sleeve members 15a, 17a and the control member 13 in their proper assembled relationships. Welds have eliminated mating slots and members. It is noteworthy, also that in this invention the control member retainer washer 31, FIG. 4, has been eliminated. All of this facilitates assembly, since there are fewer parts and no mating of eliminated slots and members are involved. Sealing between the lower sleeve member 17 and the valve body 11, the upper and lower sleeve members 15a, 17a and the retainer member 21a and the valve body 11, is provided by respective O-rings 39 and 35. The intermediate O-ring 37 of the prior art has been eliminated by this invention. Sealing between the retainer member 21 and the control member stem portion 17 is provided by O-ring 33.

The upper and lower sleeve members 15a, 17a are provided complimentary oppositely facing diagonal grooves 91, 93 for receiving and retaining the diagonal O-ring 19. The configuration of the groove 91, 93 and their orientation when the valve is assembled is such that the central axis of the discharge passage 61 and the O-ring 19 intersect, with the O-ring 19 being symmetrically disposed about an imaginary cylindrical projection of the discharge passage 61.

The flow control portion 81 of the control member 13 has a length sufficient to extend well beyond the upper and lower extremities of the diagonal O-ring 19. The lower portion of the flow control portion 81 is in the form of an annular skirt that is conformingly received within the interior cylindrical surface to achieve additional axial stability. The flow control portion 81 includes a flow direction transition surface 97.

The correct order and assembly can be understood more nearly completely by referring to FIG. 2. Therein is shown the diagonal O-ring 19 as it will be conformingly received in the groove formed when the lower sleeve 17a is inserted within the upper sleeve 15a. The sealing ring 39 is illustrated in its place as it will be emplaced between the upper and lower sealing ring in particularly the flange 76 of the lower member 17a. On the other side of the upper sleeve member, the seal 35 is illustrated, the intermediate seal 33 that seals between the control member 13a and the upper sleeve 15a. The retainer 21a is illustrated.

FIG. 3 illustrates the operable portion of the valve where the skirt has turned to close off the discharge passageway 61 through the conduit 63.

A valve constructed in accordance with the present invention has several advantages over valves of the prior art. Even the priorly described patent application filed Sept. 22, 1980 by Mr. Dennis J. Hayman had several advantages over the prior art but needed a couple of improvements. This invention achieves the unobvious improvements while retaining the advantages of the aforesaid priorly filed application by Mr. Hayman, now U.S. patent (patent number not yet received). Specifically, the control member needed improved axial stability to be able to handle the greater flow rates of liquid therethrough and there needed to be a bottom end protection from impingement of the fluid and any impurity that might be carrying at the lower end of the control member. Typical dimensions of the valve material is shown in Table 1.

TABLE I

| Description | Inch or Inches (") |
|---|---|
| Length of valve body | 1.25–1.3" |
| Length of control member | 2.0–2.1" |
| Diameter of control member | .36–.37" |
| Outside diameter of flange | .6–.7" |
| Diameter of radius of sphere used to perform the transition surface in the range of | 0.02–0.03" |
| Bottom of skirt is arcuate with a diameter of about | 0.01–0.03 times the radius employed for the flow transition surface |
| Diameter of discharge port 61 | .3–.33" internal |

From the foregoing it can be seen that this invention achieves the objects delineated hereinbefore. More specifically, this invention provides an improvement in the invention in U.S. patent application Ser. No. 930,318, filed Nov. 12, 1986, by Dennis J. Hayman, which is owned by the assignee of this application, the improvement being to impart a flange protection at the bottom of the lower sleeve member; and increase an intermediate flange diameter and add a skirt cylindrical portion for improved axial stability of the control member and alleviate problems associated with the prior art approaches.

Although this application has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

I claim:

1. A faucet valve comprising:
   a. a valve body having a bottom fluid inlet passage and a side fluid discharge passage having a central axis;
   b. upper and lower sleeve member disposed in said inlet passage,
      i. said upper and lower sleeve members each having an interior cylindrical surface of the same diameter,
      ii. said upper and lower sleeve members having complimentary oppositely facing diagonal grooves for receiving and retaining a diagonal sealing ring, said lower sleeve member having at its bottom a peripheral, radially interiorly and exteriorly extending flange that protects against the deleterious effects of incoming fluid;
   c. a diagonal sealing ring having a central axis and disposed in said grooves,
      i. the configuration and orientation of said grooves being such that the central axes of said discharge passage and said sealing ring intersect and said sealing ring is symmetrically disposed about an imaginary cylindrical projection of said discharge passage;
   d. a flow control member having,
      i. a flow control portion having a stem portion with a cylindrical exterior surface that is matingly received within said interior cylindrical surfaces of said upper and lower sleeve members and having length sufficient to extend beyond the upper and lower extremities of said diagonal sealing ring,
      ii. a flow control portion having a lower end portion that includes a flow direction transition surface, and having a cylindrical skirt portion that encompasses said transition surface and is conformingly received within said lower sleeve member for improved axial stability, and iii. an intermediate flange having relatively large outside diameter and being trappingly received for improved axial stability;
   e. said control member being rotatable substantially 180 degrees from a full open position to a full closed position and vice versa, with said sealing ring being in contact with the exterior surface of said control member flow control portion over a major portion of the sealing ring inner periphery during the initial stages of opening of the valve when differential pressure is high, and with metering of fluid flow extending over a major portion of the control member rotational range;
   f. a retaining member having a generally cylindrical surface and shape and having a cylindrical exterior surface that mates with the upper bore of said valve body and having an interiorly disposed groove trappingly receiving said intermediate flange of said flow control member;
   g. first positive connection intermediate the top portion of said upper sleeve and said retaining member for eliminating mating slots and co-engaging members and facilitating assembly; and
   h. second positive connection intermediate said lower portion of said lower sleeve and said lower portion of said upper sleeve member for eliminating mating slots and co-engaging members and facilitating assembly;

whereby there is obviated the need for a retaining washer to facilitate assembly, and mating slots and co-engaging members to facilitate assembly and whereby there is provided a faucet with a combination of a static, diagonally disposed seal and a flow control portion that is rotatable and throttling throughout the major portion of its rotation and without moving any control past the diagonal sealing ring so as to prevent seal damage due to cutting, chaffing and excessive wear and so as to prevent seal blowout due to high differential pressure of relatively narrow throttling range, and having the advantages of having protection against incoming fluid and any contaminants therein and having improved axial stability and ease of assembly.

2. The device of claim 1 wherein said sealing ring is an O-ring.

3. The valve of claim 1 wherein said upper and lower sleeve members are made of a plastic material.

4. The valve of claim 1 wherein said retainer that holds said control member pivotally within said valve is formed of a thermoplastic material; and said upper sleeve is formed also of a thermoplastic material.

5. The valve of claim 4 wherein said control member is formed of a different thermoplastic material from said thermoplastic material of said retainer and said upper sleeve.

* * * * *